(12) United States Patent
Hwang et al.

(10) Patent No.: US 7,543,667 B2
(45) Date of Patent: Jun. 9, 2009

(54) MOUNTING STRUCTURE FOR COMPRESSED GAS STORAGE TANK OF VEHICLE

(75) Inventors: Ki Ho Hwang, Gyeonggi-do (KR); Gyu Jin Jang, Gyeonggi-do (KR); Young Min Choi, Daejeon (KR); Sang Hyun Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 11/998,626

(22) Filed: Nov. 29, 2007

(65) Prior Publication Data

US 2009/0000842 A1    Jan. 1, 2009

(30) Foreign Application Priority Data

Jun. 29, 2007    (KR) .................. 10-2007-0065710

(51) Int. Cl.
*B60K 15/07* (2006.01)
(52) U.S. Cl. .................. 180/69.4; 180/314; 280/834; 220/562; 248/500
(58) Field of Classification Search ............ 180/314, 180/69.4, 69.5; 280/830, 834; 220/562, 220/560.07, 560.11; 224/545, 552, 557; 248/500, 671, 312
See application file for complete search history.

(56) References Cited

U.S. PATENT DOCUMENTS 6,257,360 B1 * 7/2001 Wozniak et al. ............ 180/69.5
6,676,163 B2 * 1/2004 Joitescu et al. ............ 280/834
7,137,474 B2 * 11/2006 Yokote ...................... 180/314

FOREIGN PATENT DOCUMENTS

| EP | 1262710 | 12/2002 |
|----|---------|---------|
| GB | 2259757 | 3/1993 |
| JP | 2002-340298 | 11/2002 |
| JP | 2004-257413 | 9/2004 |
| JP | 2006-046645 | 2/2006 |
| KR | 10-2004-0022207 | 3/2004 |

* cited by examiner

*Primary Examiner*—Christopher P Ellis
*Assistant Examiner*—John D Walters
(74) *Attorney, Agent, or Firm*—Edwards Angell Palmer & Dodge LLP; Peter F. Corless

(57) ABSTRACT

The present invention provides a mounting structure for a compressed gas storage tank of a vehicle in which at least two high pressure storage tanks are modularized and mounted in a vehicle.

For this, the present invention provides a mounting structure for a compressed gas storage tank of a vehicle, comprising: a plurality of storage tanks for storing a compressed gas therein, including a hemispherical dome portion formed on both ends thereof; panel brackets connected to both ends of the storage tanks; pipe frames connecting edges of the panel brackets connected to both sides of the storage tanks; and high pressure parts and pipes connected to the storage tanks in a state where the panel brackets and the pipe frames are connected.

9 Claims, 4 Drawing Sheets

MOUNTING STRUCTURE FOR COMPRESSED GAS STORAGE TANK OF VEHICLE

CROSS-REFERENCE TO RELATED APPLICATION

This application claims under 35 U.S.C. §119(a) on Korean Patent Application No. 10-2007-0065710, filed on Jun. 29, 2007, the entire contents of which are incorporated herein by reference.

BACKGROUND (a) Technical Field

The present invention relates to a mounting structure for a compressed gas storage tank of a vehicle. More particularly, the present invention relates to a mounting structure for a compressed gas storage tank of a vehicle in which at least two high pressure storage tanks are modularized and mounted in a vehicle.

(b) Background Art

At present, as the problem of air pollution caused by vehicles becomes more serious day by day, extensive research aimed at developing a low emission vehicle has continued to progress. As an alternative to gasoline or diesel fuel vehicles, compressed natural gas or fuel cell vehicles have been developed and used.

The compressed natural gas (CNG) is produced by compressing a gas such as natural gas, coal gas, petroleum gas, casinghead gas, coal mine gas, etc. at 200 atmospheric pressure or higher. The CNG does not generate smoke or dust compared with a diesel vehicle, and noise generated by CNG vehicles does not exceed 50% of that generated by diesel vehicles.

Nitrogen oxide, which contributes to ozone formation, produced by CNG vehicles is about 37% of that produced by diesel vehicles, and carbon monoxide and hydrocarbon are as low as 41% and 16%.

The basic structure of CNG vehicles is the same as diesel vehicles, except for the fuel system. That is, CNG compressed at a high pressure is stored in a gas tank, the pressure of the compressed gas supplied from the gas tank through a fuel pipe is reduced by a pressure reducing valve to an operating pressure, and the gas at a reduced pressure is mixed with air and supplied to the engine.

Accordingly, CNG is contained in a fuel tank made of a relatively thick metal material due to the risk of explosion.

However, the fuel tank made of a metal material causes a problem in that it reduces the fuel efficiency of the vehicle due to its heavy weight.

In order to solve such a problem, Korean Utility Model Publication No. 1996-0005988 discloses a fuel tank for a compressed natural gas vehicle with improved flame resistance and impact resistance.

The fuel tank storing CNG and hydrogen gas at a high pressure comprises a cylinder having a hollow interior and a hemispherical dome integrally formed on both ends of the cylinder.

Since the fuel tank stores compressed gas at a low density, the volume of the fuel tank storing the compressed gas is increased and thus one to four fuel tanks are used.

Meanwhile, methods of mounting a compressed gas storage tank on a vehicle, which have been proposed up to now, can be broadly classified into the following two categories:

1) a method of modularizing a high pressure storage system by surrounding a body portion of a storage tank with at least two brackets in the shape of a belt to form a frame and mounting the frame on a vehicle body; and 2) a method of fixing both neck portions of the storage tank using brackets, and directly mounting the same on the vehicle body, or mounting the same on a frame and then fixing the frame on the vehicle body.

However, these methods of mounting the compressed gas storage tank in a vehicle body have some drawbacks in that the weight and manufacturing cost of a fuel storage system are increased since the structure of the bracket in the shape of a belt and the frame is complicated.

Another method has been proposed in which a plurality of tanks are modularized in an impact absorbing cell and the module is mounted in the vehicle body. Still another method has been proposed in which a high pressure storage system is integrated with a rear suspension and the integrated structure is fixed on the vehicle body.

Yet, these methods still have some drawbacks in that an additional configuration must be provided to protect high pressure parts and pipes from an external collision or impact.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

The present invention has been made in an effort to solve the above problems, and an object of the present invention is to provide a mounting structure for a compressed gas storage tank of a vehicle, in which at least two high pressure storage tanks are modularized by panel brackets and pipe frames, and high pressure parts and pipes are protected from an external collision or impact by protective panels.

In one aspect, the present invention provides a mounting structure for a compressed gas storage tank of a vehicle, comprising a plurality of storage tanks for storing a compressed gas therein, a plurality of panel brackets, a plurality of pipe frames, and high pressure parts and pipes. Each of The storage tanks includes a hemispherical dome portion formed on both ends thereof. The panel brackets are connected to both ends of the storage tanks. The pipe frames are connected to edges of the panel brackets. The high pressure parts and pipes are connected to the storage tanks at one or both ends thereof.

In a preferred embodiment, receiving portions having a shape corresponding to that of the dome portion of the storage tank are formed on the panel bracket so as to be closely adhered to both ends of the storage tanks.

Preferably, a gasket is attached to the outside of each of the panel brackets at both sides of the storage tanks and connected by the pipe frames to maintain the connection strength of the panel brackets.

Suitably, the panel bracket and the gasket are connected to the pipe frame having a screw portion by a nut and a washer.

Moreover, a spring is provided between the gasket and the washer to absorb expansion, in the longitudinal direction of the storage tank, which can be created in the event of filling gas.

The high pressure parts and the pipes need to be protected from an external collision or impact. As a means of the protection, the pipe frames extend in the longitudinal direction, and a first protective panel is provided to cover the ends of the pipe frames. In addition, preferably, a second protective panel is provided to cover three sides of a space between the panel bracket and the first protective panel along the circumference of the first protective panel and the panel bracket.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like. The present structures will be particularly useful with a wide variety of motor vehicles.

Other aspects of the invention are discussed infra.

Figure 1:
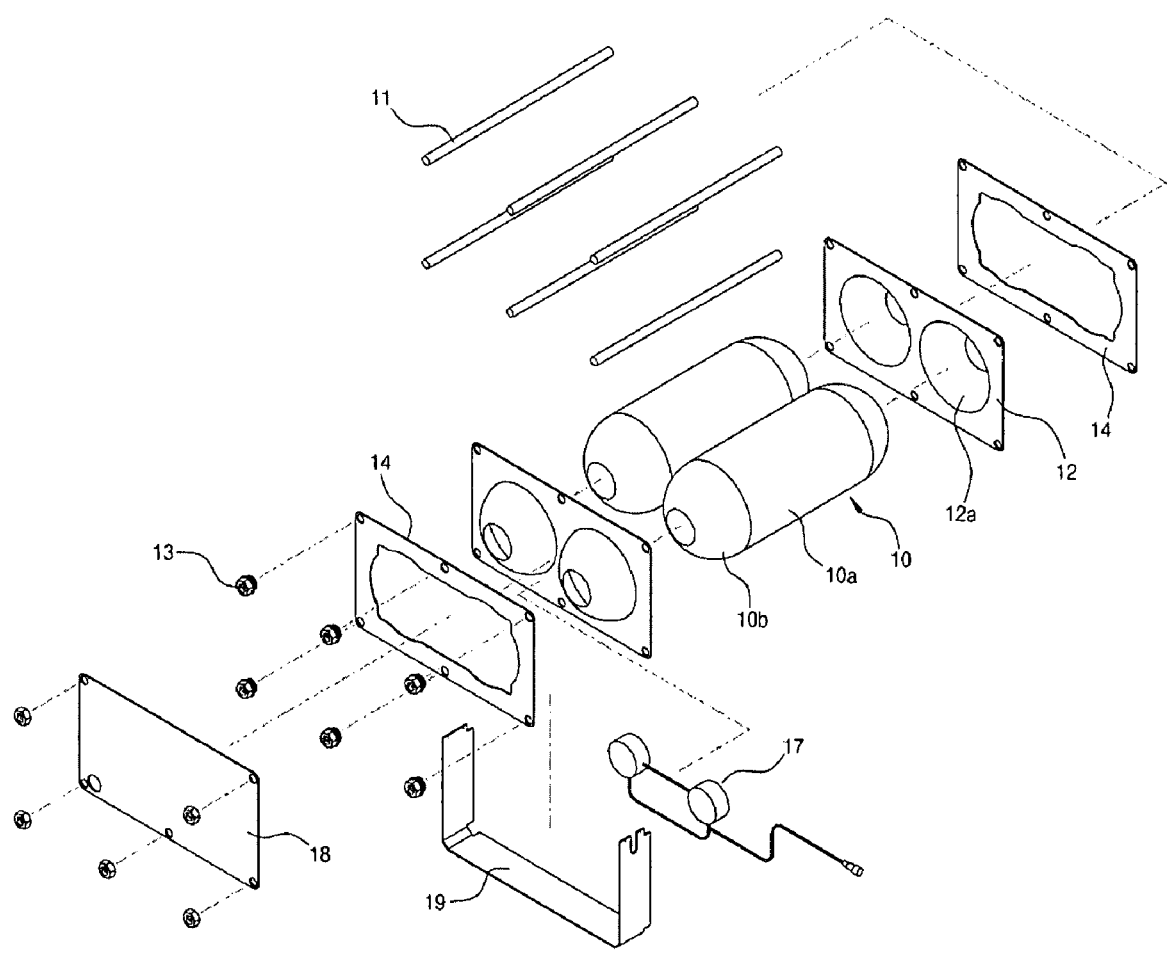
FIG. 1 is an exploded perspective view illustrating a mounting structure for a compressed gas storage tank of a vehicle in accordance with a preferred embodiment of the present invention.

Reference numerals set forth in the Drawings includes reference to the following elements as further discussed below:

| | |
|---|---|
| 10: | storage tank |
| 10a | cylinder portion |
| 10b: | dome portion |
| 11: | pipe frame |
| 12: | panel bracket |
| 12a: | receiving portion |
| 13: | nut |
| 14: | gasket |
| 15: | spring |
| 16: | washer |
| 17: | high pressure parts and pipes |
| 18: | first protective panel |
| 19: | second protective panel |

DETAILED DESCRIPTION

Reference will now be made in detail to the preferred embodiment of the present invention, examples of which are illustrated in the drawings attached hereinafter, wherein like reference numerals refer to like elements throughout. The embodiments are described below so as to explain the present invention by referring to the figures.

Figure 2A:
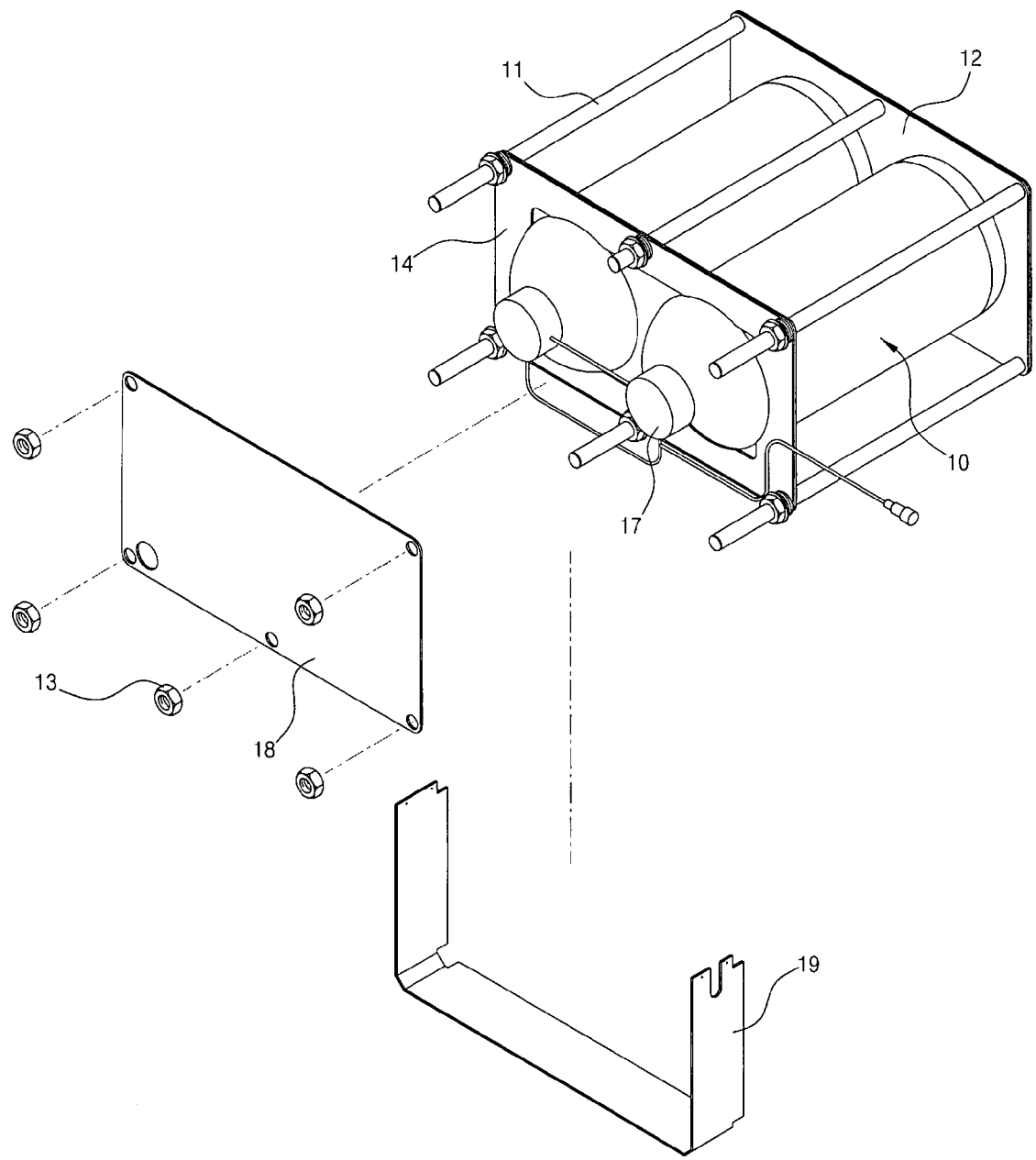
FIGS. 2A to 2C are diagrams illustrating the assembly process of the compressed gas storage tank of a vehicle of FIG. 1.
Figure 2B:
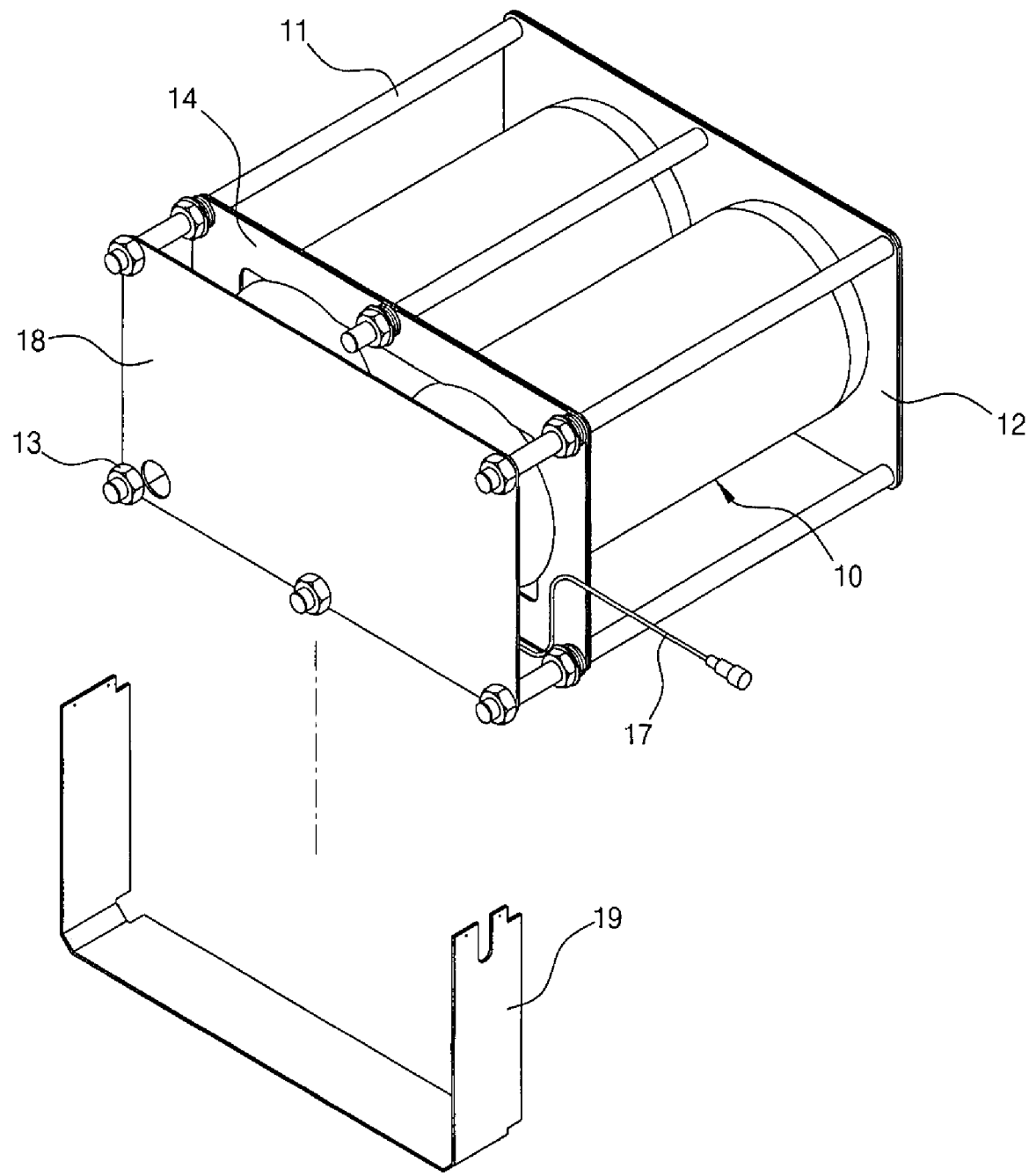
Figure 2C:
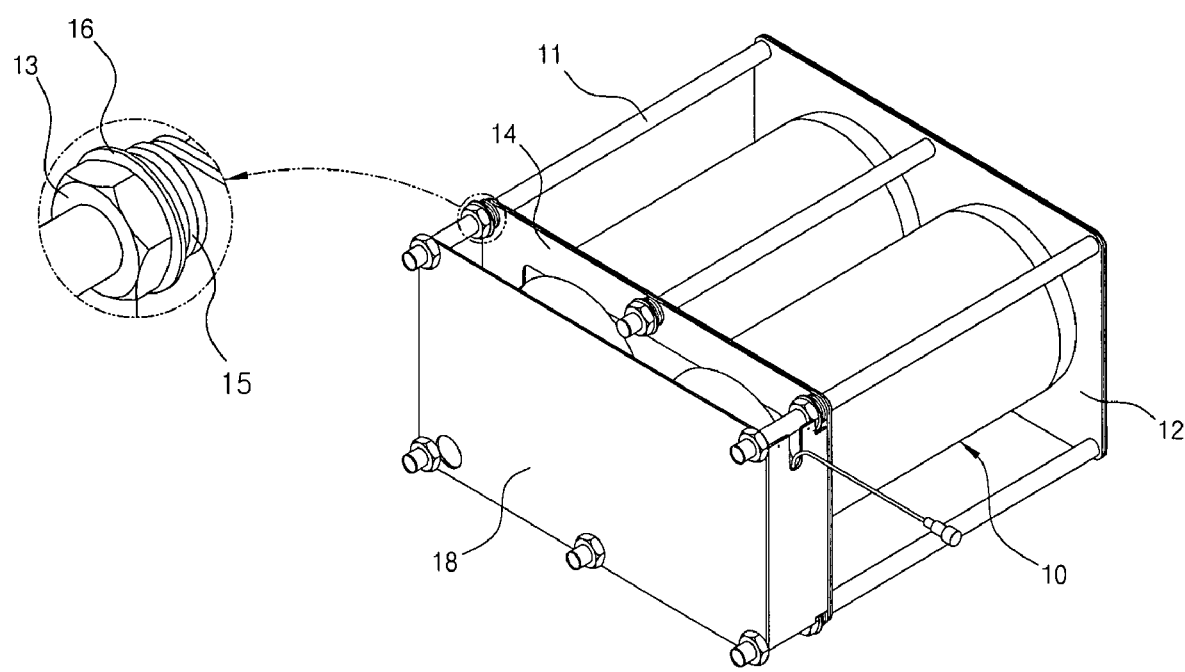

FIG. 1 is an exploded perspective view illustrating a mounting structure for a compressed gas storage tank of a vehicle in accordance with a preferred embodiment of the present invention, and FIGS. 2A to 2C are diagrams illustrating the assembly process of the compressed gas storage tank of a vehicle of FIG. 1.

The present invention provides a mounting structure for a compressed gas storage tank in which at least two compressed gas storage tanks 10 are modularized and mounted in a vehicle.

In order to modularize the plurality of compressed gas storage tanks 10, both ends of the storage tanks 10 are connected to each other using panel brackets, gaskets 14 and pipe frames 11. More particularly, the storage tank 10 includes a cylinder portion 10a having a hollow interior and a hemispherical dome portion 10b integrally formed on both ends of the cylinder portion 10a.

Both ends of the storage tanks 10 arranged parallel to each other are connected by panel brackets 12, and both ends of pipe frames 11 penetrate the edges of the panel brackets 12 and are connected thereto by means of nuts 13.

Receiving portions 12a having a shape corresponding to that of the dome portion 10b of the storage tank 10 are formed on the panel bracket 12, and a hole through which a port cap of the storage tank 10 can be inserted is formed on a central portion of the receiving portion 12a.

A gasket 14 is attached to the outside of each of the panel brackets 12 to maintain the connection strength between the panel bracket 12 and the pipe frames 11.

That is, the storage tanks 10 are modularized by both the panel brackets 12 and the gaskets 14 connected by the pipe frames 11. At this time, a spring 15 is inserted in each end of the pipe frames 11 and, then, the panel bracket 12 and the gasket 14 are connected by washers 16 and nuts 13.

Since the storage tank 10 storing gas at a high pressure expands both in the circumferential direction and in the longitudinal direction, the spring 15 is inserted between the panel bracket 12 and the nut 13 to absorb expansion in the longitudinal direction when filling gas, thus accommodating the stress generated in the storage tanks 10.

As described above, the plurality of storage tanks 10 are connected in parallel using the panel brackets 12, the gaskets 14, and pipe frames 11. To the storage tanks are connected the high pressure parts and the pipes 17. A plurality of opening portions is, thus, formed on the panel brackets 12 and the gaskets 14, respectively, so as to be able to connect tank valves and port caps.

The high pressure parts and the pipes 17 are connected to the compressed gas storage tank 10 through the opening portions. Since the compressed gas used as a vehicle fuel is a combustible gas, it is necessary to protect the high pressure parts and the pipes 17 from an external impact.

In order to protect the high pressure parts and the pipes 17 from an external impact, the pipe frames 11 penetrating the edges of the gasket 14 extend to a predetermined length, and a first protective panel 18 having a planar shape is provided on the ends of the extending pipe frames 11.

Besides, a second protective panel 19 having a substantially U shape in cross section is mounted on the pipe frames 11 to close three sides of a space between the first protective panel 18 and the panel bracket 12. In particular, the second protective panel 19 closes, for example, left, right and bottom sides of the space along the circumference of the first protective panel 18 and the panel bracket 12.

With the first and second protective panels 18 and 19 as described above, it is possible to protect the high pressure parts and the pipes 17 from an external collision or impact.

The assembly process of the compressed gas storage tank having the above-described configuration in accordance with the preferred embodiment of the present invention will be described below.

First, the panel brackets 12 are arranged on both ends of the storage tanks 10 such that the receiving portions 12a of the panel brackets 12 are closely adhered to the dome portions 10b of the storage tanks 10. The panel brackets 12 and the gaskets 14 on both sides of the storage tanks are connected by the pipe frames 11. Subsequently, the springs 15 are inserted into the ends of the pipe frames 11 and fixed by the washers 16 and the nuts 13.

Then, after the high pressure parts and the pipes 17 are connected to the storage tanks 10, the first and second protective panels 18 and 19 are fixed to the pipe frames 11 using fastening means such as screws, thus protecting the high pressure parts and the pipes 17.

As described above, the present mounting structures in accordance with preferred embodiments of the present invention simplify the configuration of the parts, reduce overall weight of the system and manufacturing cost, and increase high pressure parts associated safety.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A mounting structure for a compressed gas storage tank of a vehicle, comprising:
    a plurality of storage tanks for storing a compressed gas therein, each of which includes a hemispherical dome portion formed on both ends thereof;
    a plurality of panel brackets connected to both ends of the storage tanks;
    a plurality of pipe frames connecting edges of the panel brackets; and
    high pressure parts and pipes connected to the storage tanks at at least one end thereof,
    wherein a gasket is attached to the outside of each of the panel brackets at both sides of the storage tanks and connected by the pipe frames to maintain the connection strength of the panel brackets.

2. The mounting structure of claim 1, wherein receiving portions having a shape corresponding to that of the dome portion of the storage tank are formed on the panel bracket so as to be closely adhered to both ends of the storage tanks.

3. The mounting structure of claim 1, wherein the panel bracket and the gasket are connected to the pipe frame having a screw portion by a nut and a washer.

4. The mounting structure of claim 3, wherein a spring is provided between the gasket and the washer to absorb expansion in the longitudinal direction of the storage tank when filling gas.

5. The mounting structure of claim 4, wherein, the pipe frames extend in the longitudinal direction, a first protective panel is provided to cover the ends of the pipe frames, and a second protective panel is provided to cover three sides of a space between the panel bracket and the first protective panel along the circumference of the first protective panel and the panel bracket.

6. The mounting structure of claim 2, wherein a gasket is attached to the outside of each of the panel brackets at both sides of the storage tanks and connected by the pipe frames to maintain the connection strength of the panel brackets.

7. The mounting structure of claim 6, wherein the panel bracket and the gasket are connected to the pipe frame having a screw portion by a nut and a washer.

8. The mounting structure of claim 7, wherein a spring is provided between the gasket and the washer to absorb expansion in the longitudinal direction of the storage tank when filling gas.

9. The mounting structure of claim 8, wherein, the pipe frames extend in the longitudinal direction, a first protective panel is provided to cover the ends of the pipe frames, and a second protective panel is provided to cover three sides of a space between the panel bracket and the first protective panel along the circumference of the first protective panel and the panel bracket.

* * * * *